No. 811,694. PATENTED FEB. 6, 1906.
T. J. CAMPBELL.
SEED HARVESTER.
APPLICATION FILED JUNE 20, 1904.
5 SHEETS—SHEET 2.
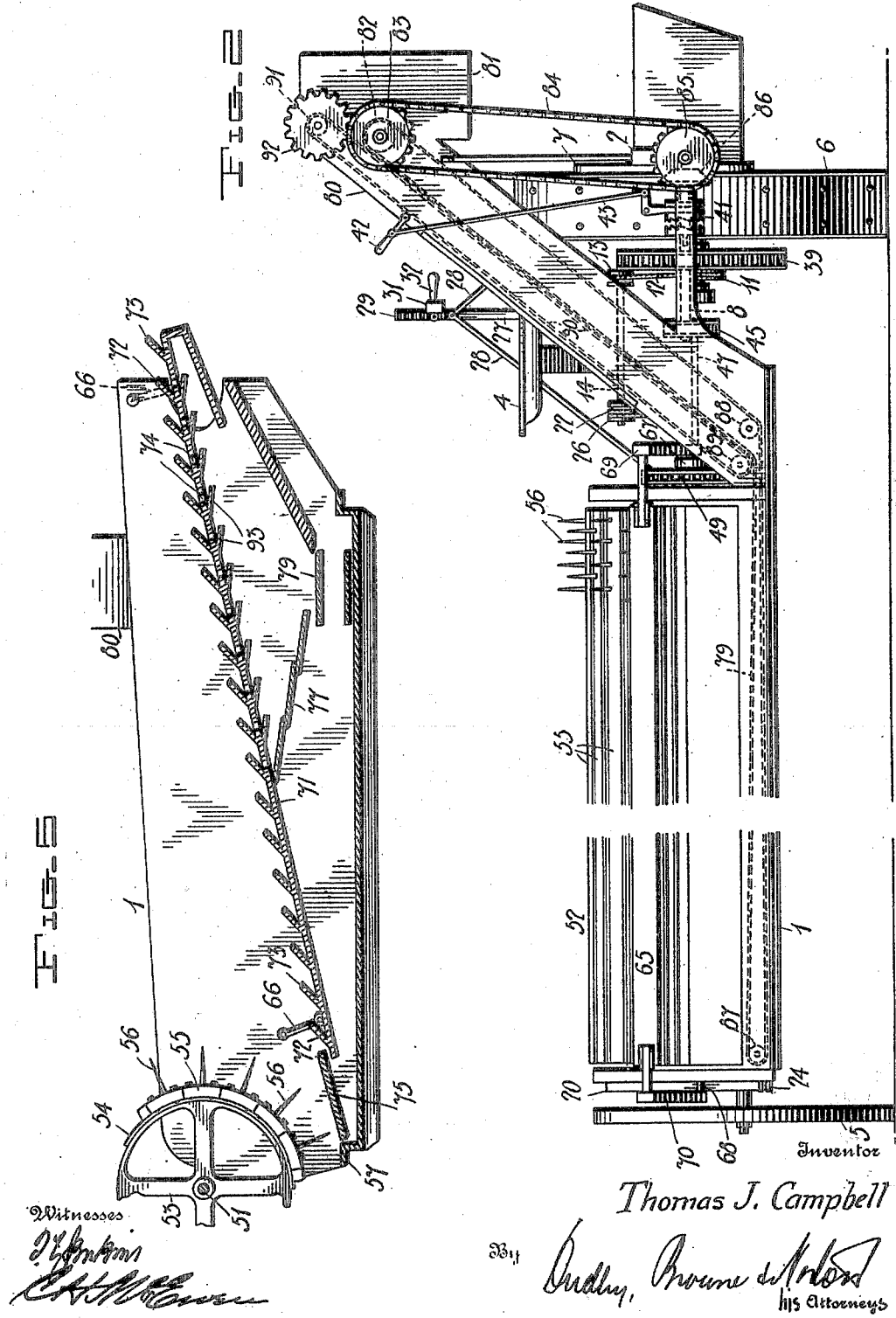
Witnesses
Inventor
Thomas J. Campbell
By
his Attorneys

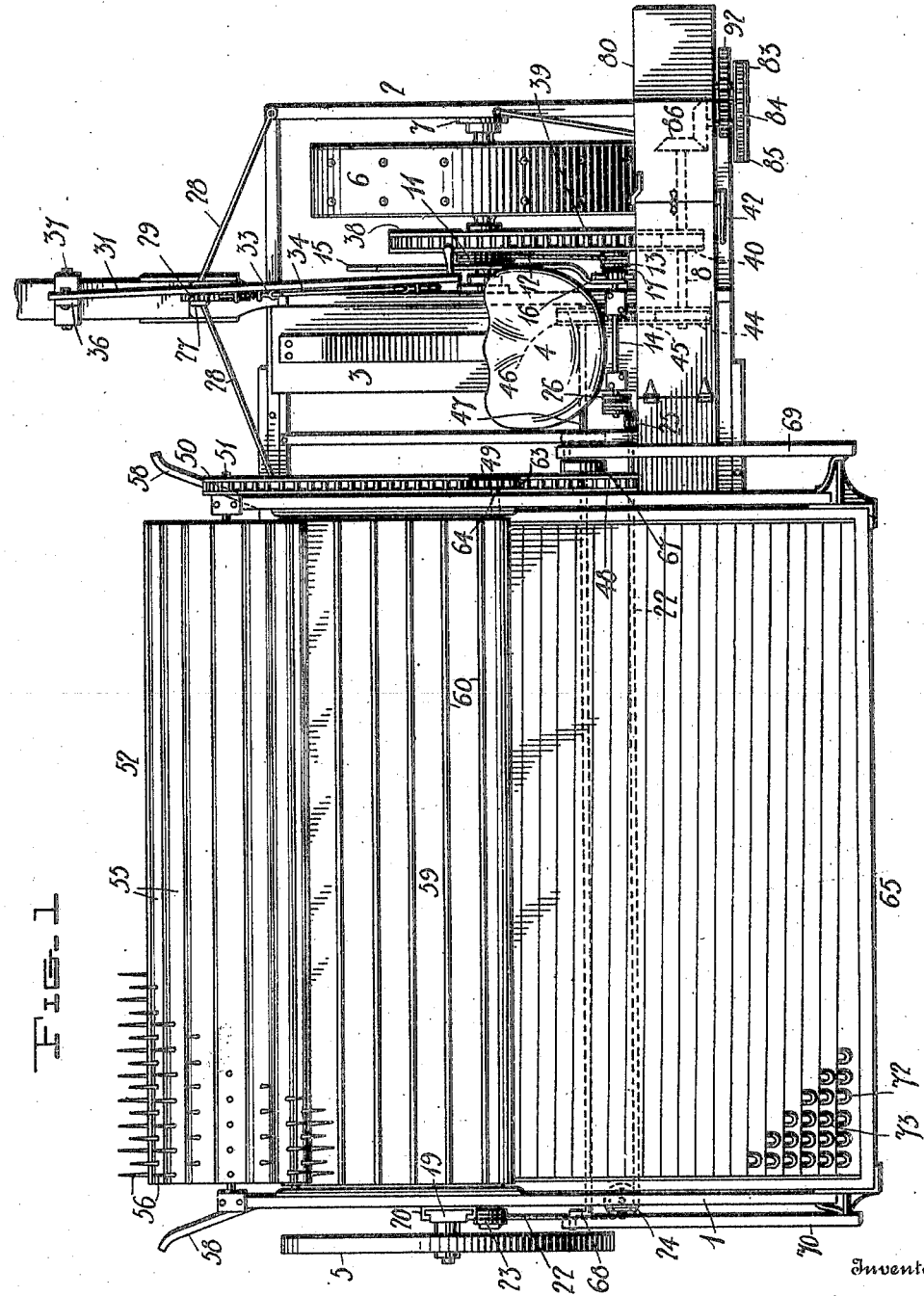

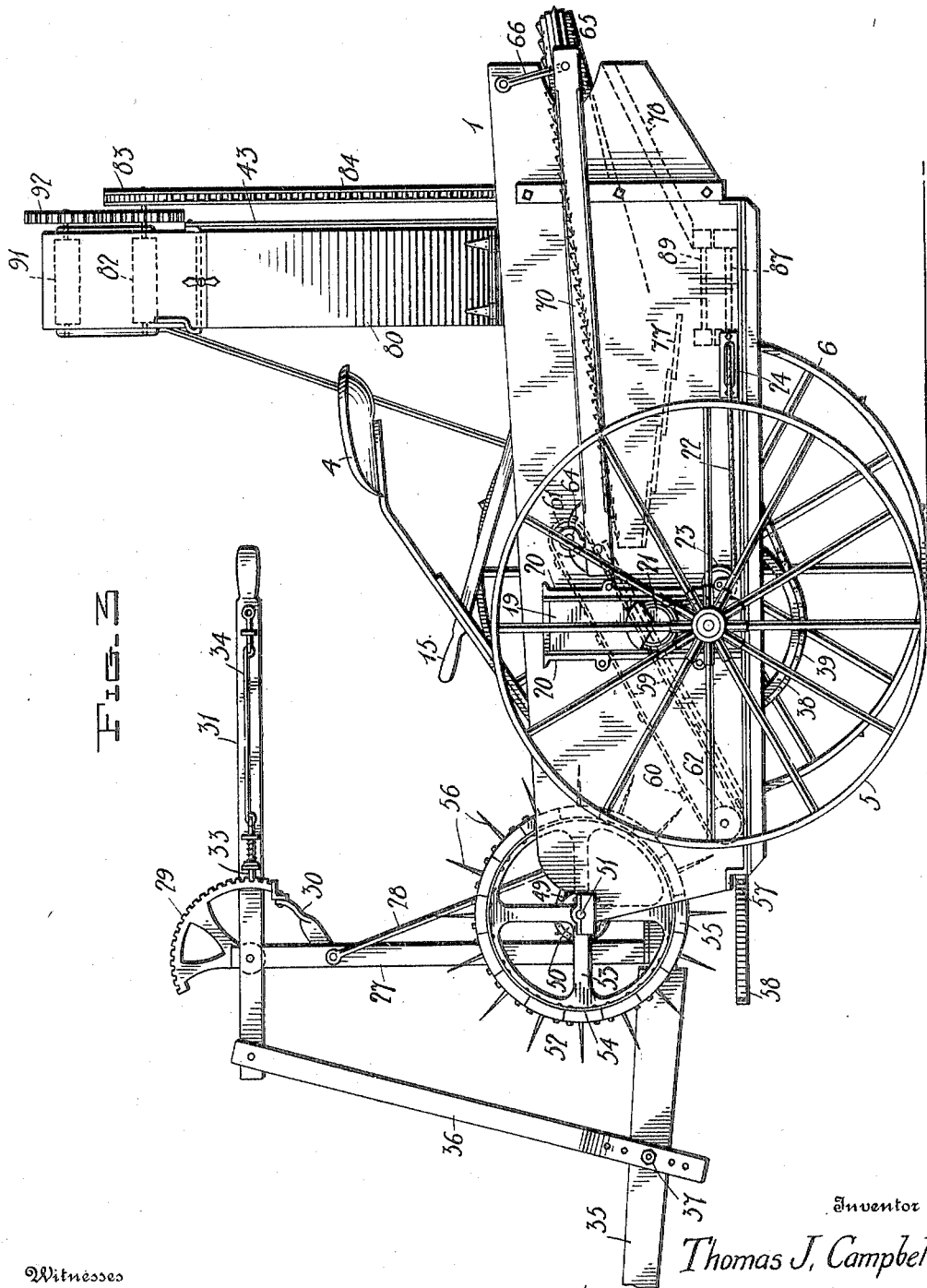

No. 811,694. PATENTED FEB. 6, 1906.
T. J. CAMPBELL.
SEED HARVESTER.
APPLICATION FILED JUNE 20, 1904.
5 SHEETS—SHEET 4.
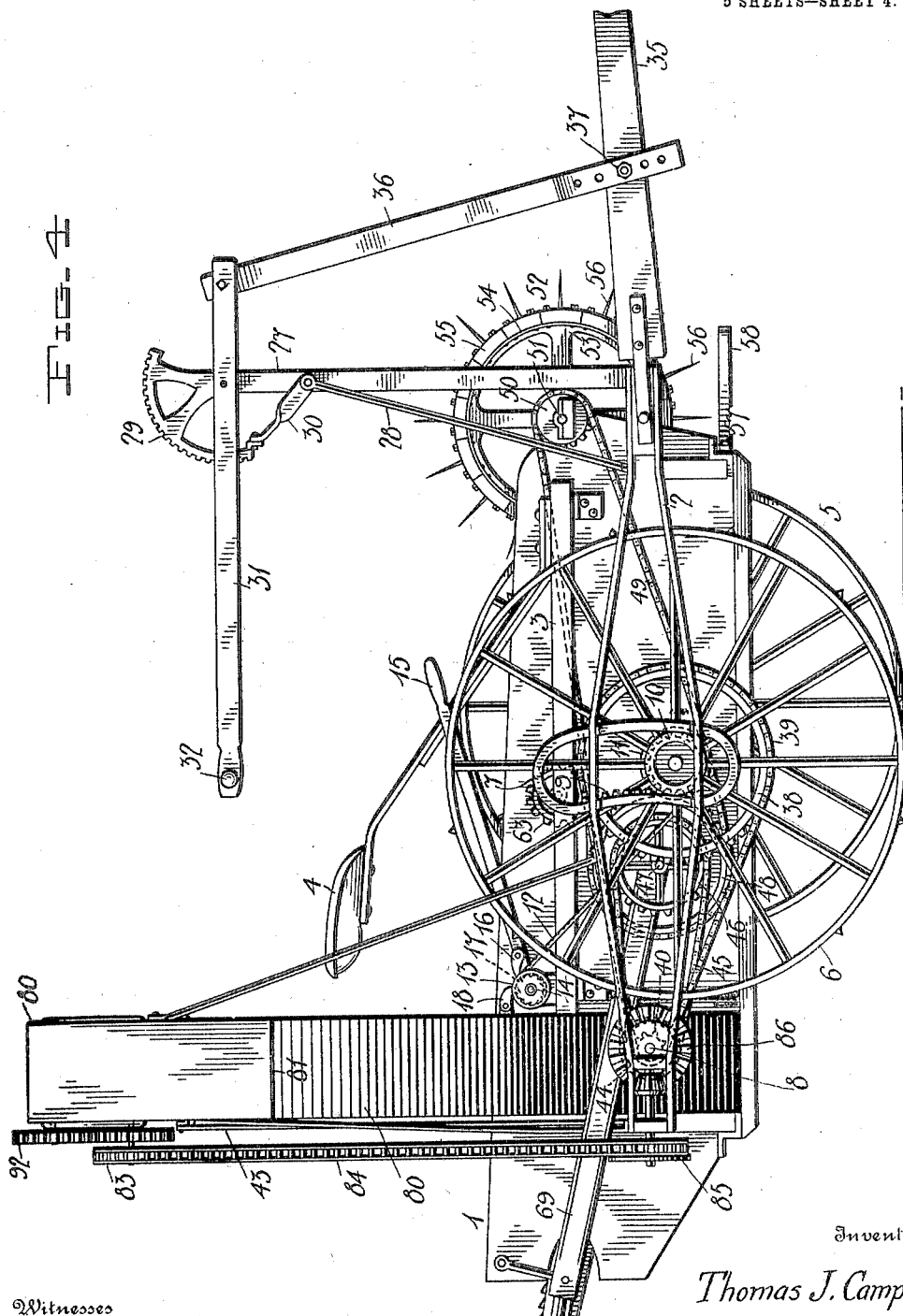
Witnesses
Inventor
Thomas J. Campbell
By
his Attorneys No. 811,694. PATENTED FEB. 6, 1906.
T. J. CAMPBELL.
SEED HARVESTER.
APPLICATION FILED JUNE 20, 1904.
5 SHEETS—SHEET 5.
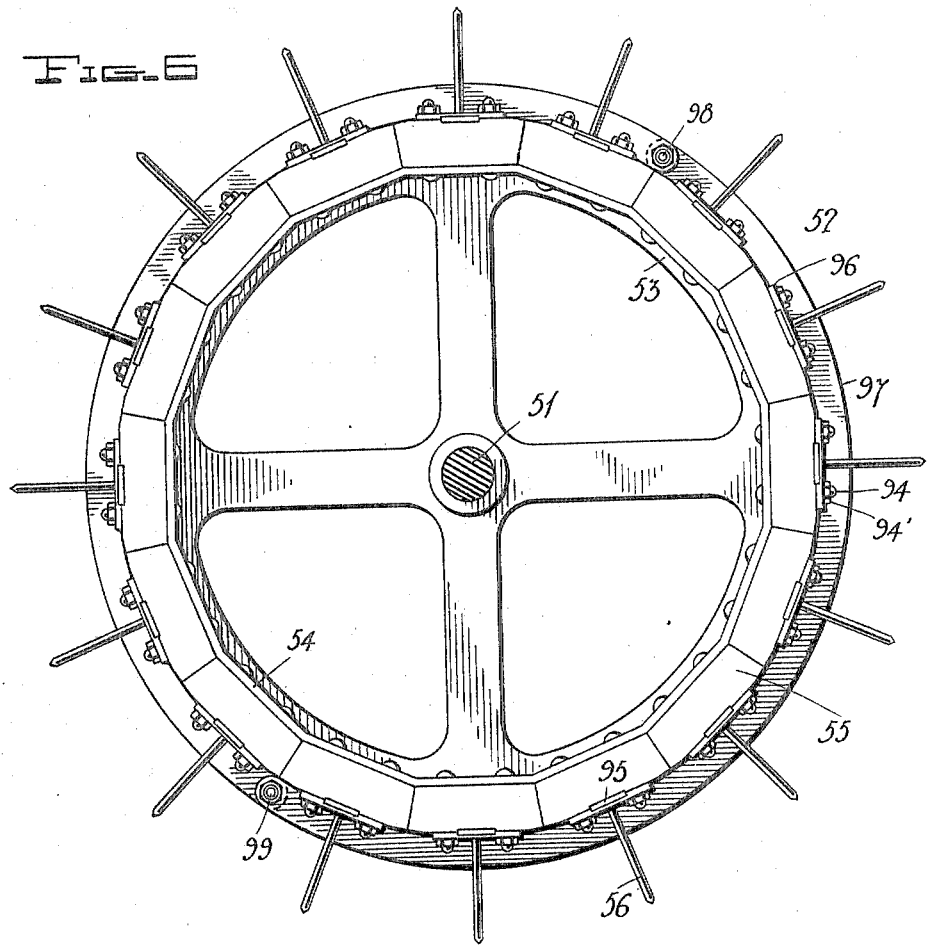
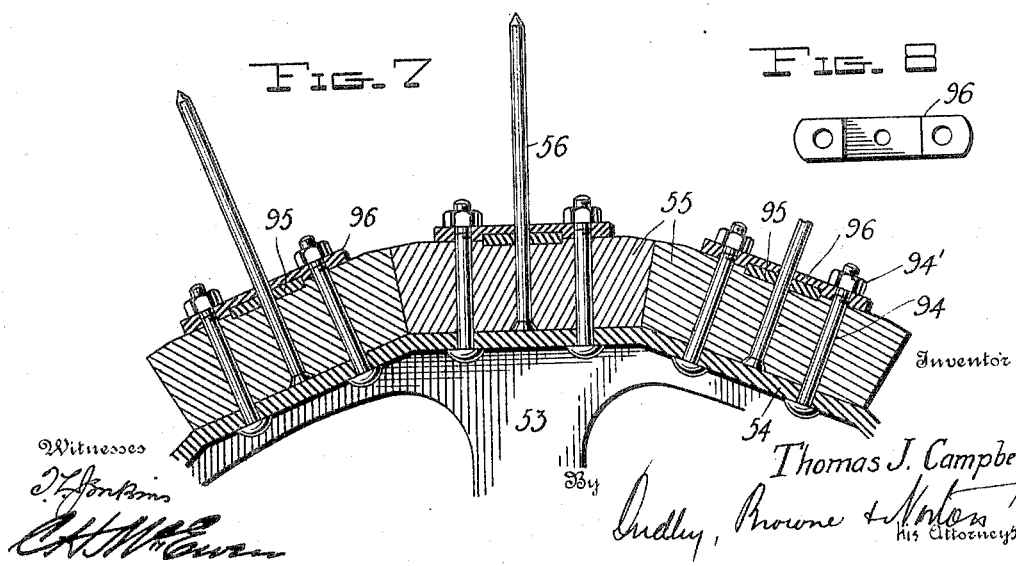
Witnesses
Inventor
Thomas J. Campbell
By Dudley, Browne & Norton
His Attorneys

UNITED STATES PATENT OFFICE.

THOMAS J. CAMPBELL, OF LATHROP, MISSOURI.

SEED-HARVESTER.

No. 811,694.  Specification of Letters Patent.  Patented Feb. 6, 1906.

Application filed June 20, 1904. Serial No. 213,359.

*To all whom it may concern:*

Be it known that I, THOMAS J. CAMPBELL, a citizen of the United States, residing at Lathrop, in the county of Clinton and State of Missouri, have invented certain new and useful Improvements in Seed-Harvesters; and I do hereby declare the following to be a full, clear, and exact description of the invention, such as will enable others skilled in the art to which it appertains to make and use the same.

This invention, which relates to seed-harvesters, contemplates the production of a machine of this character containing improvements which while adapting it for harvesting seeds generally regardless of the kind or height of growth of material render it especially desirable for stripping blue-grass and the like.

The nature of the improved machine will be readily comprehended, reference being had to the following detailed description and to the accompanying drawings, illustrating the invention in its preferred form of embodiment, it being understood that various modifications may be made therein without exceeding the scope of the concluding claims.

In the drawings, Figure 1 is a top plan view of a seed-harvester embodying my invention. Fig. 2 is a rear elevation. Fig. 3 is a side elevation viewed from the left of the machine. Fig. 4 is a right-hand side elevation. Fig. 5 is a longitudinal sectional view showing a modification. Figs. 6, 7, and 8 are detail views of my preferred form of stripping-cylinder.

Referring to the drawings by numerals, 1 designates the main frame of the machine, and 2 is a frame extending transversely from the main frame and on which is a platform 3, supporting a driver's seat 4. The machine is supported by a wheel 5 at the left-hand side of the main frame and by a wheel 6 at the right-hand side of the extension-frame, said latter wheel being employed as the driver for the moving parts. The main and extension frames and the parts carried thereby are at the right-hand side vertically adjustable relatively to the height of the grass or other seed material by means constructed and operating preferably as follows: Fixed to the extension-frame is a casting 7, having a slot the walls of which are curved to conform to an arc drawn from a radius of which the axis of a rear driven shaft 8, presently to be referred to, is the center, one of the slot-walls being provided with a series of teeth or rack 9, engaged by a gear-wheel 10, fixed to a sleeve loose on the wheel-axle. Fixed to said sleeve is a sheave 11, to which is attached one end of a cable 12, the other end being fastened to a drum 13 on a shaft 14. The drum is revolved by a hand-lever 15, pivoted on the shaft and carrying a pawl 16, which is in engagement with the teeth of a ratchet-wheel 17, keyed on said shaft. The cable before being fastened to the sleeve 11 is passed partly around the latter, and by revolving the drum the gear-wheel 10 is, through the cable connection, partially revolved to effect the raising of the frame and parts carried thereby by the engagement of the gear-wheel with the curved rack. The adjustment is maintained, preferably, by the engagement of a lock-pawl 18 with the ratchet-wheel 17. The described adjusting means is located at the right-hand side of the machine or adjacent to the drive-wheel 6 and is more clearly shown in Fig. 4. In said figure the machine is shown in its raised position, the gear-wheel 10 engaging the lowermost teeth of the rack 9.

In Fig. 3 more particularly is shown the means of adjustment at the wheel 5 or left-hand side of the machine. Extending from the axle of said wheel is a bracket 19, slidably confined between guides 20 20 on the outer side of the main frame, and on said bracket is a sheave 21, around which passes a rope or cable 22, attached at one end to the frame. From the sheave 21 the rope or cable passes around an idler-sheave 23 on the frame side, thence around a horizontal idler-sheave 24, journaled in an opening in said side, thence to and around a vertical idler-sheave 25 at the opposite side of the frame, and finally around a drum 26 on the shaft 14. In the operation of the adjusting means the drums 13 and 26 are simultaneously revolved, and the machine is by the described devices raised to the desired height and there maintained by the locking-pawl.

Vertical adjustment of the machine at its front is obtained by the following means: Erected at the front end of the extension-frame is a post 27, braced by rods 28 28 and carrying at its upper end a segmental rack 29, braced by a rod 30, secured thereto and to the post. Pivoted to the upper end of the post is a lever 31, having at one end a handle 32 and carrying a spring-pressed pawl 33, normally engaging the rack 29. Suitable hand means, such as the slidable rod 34 on the lever, is employed to disengage the pawl from the rack. The draft-tongue 35 is pivotally attached to the extension-frame, and adjustably connecting said tongue and the opposite end of the lever 31 is a rod 36, the lower end of which is bifurcated to receive the tongue and has a series of holes for the fastening-bolt 37, said holes permitting the adjustment between the lever and tongue. Movement of the lever 31 after disengagement of the pawl and rack obtains the desired vertical adjustment of the front of the machine, the adjusted position being maintained by the reëngagement of the pawl and rack Fixed to the drive-wheel 6 to rotate therewith is a sprocket-wheel 38, connected by a chain 39 with a smaller sprocket-wheel 40, loose on the shaft 8. A clutch 41 between the wheel 40 and shaft 8 is provided to throw the shaft into action, the clutch being operated by a lever 42, pivoted on the elevator-casing, presently to be described, which lever is connected by a rod 43 with the movable clutch member. Keyed on the shaft 8 is a sprocket-wheel 44, connected by a chain 45 with a sprocket-wheel 46, fixed on a shaft 47. Keyed on the shaft 47 is a relatively large sprocket-wheel 48, connected by a chain 49 with a smaller sprocket-wheel 50 on the shaft 51 of a stripping-cylinder 52, whereby said cylinder is rapidly revolved in the forward movement of the machine. The cylinder is built up of wheels 53, a shell 54, and removable segments 55, each carrying a series of fingers 56, which act to strip the seeds from the grass or other material, said fingers coöperating with a transverse bar 57 at the front of the machine, which bar is of ⌐-form in cross-section, whereby to resist the strain to which it is subjected by the seed-bearing material.

The grass is directed to the stripping-cylinder by arms 58, secured in inclined position at the sides of the main frame. The seed, fibers, and foreign material caught by the stripping-cylinder and bar are conveyed to a seed-separator, presently to be described, either by a table or an endless apron, both of which are illustrated. Referring more particularly to Figs. 1 and 3, 59 designates the endless apron, which is transversely ribbed, as at 60, and which travels over a driven roller 61 and an idle roller 62, the rollers being disposed to give to the apron the inclination shown. The roller 61 is driven by the engagement of the chain 49 with a sprocket-wheel 63, fixed to the shaft 64 of said roller. The material carried by the endless apron is delivered onto a separator 65, which is supported by hanger-rods 66 and is vibrated by the following means: The shaft 47 is extended transversely across the main frame at the rear of the latter and is journaled in bearings on the main frame and is provided with two cranks 67 68, connected by pitmen 69 70 with the separator, and during the revolution of said shaft the separator is by the crank-and-pitman connection rapidly vibrated to effect the separation of the seed from the fibers and foreign material. The separator consists of a frame-supported plate 71, having a series of inclined baffle-shoulders 72 73, at which are openings 74, through which the seeds pass, the fibers and foreign material being propelled by the shoulders rearwardly over the plate and finally discharging at the rear of the machine either onto the ground or in a suitable receptacle provided for the purpose. The shoulders by their peculiar form act on the fibers and foreign material to compel them to point in a direction transversely to the line of propulsion, whereby clogging is prevented, and the seeds at all times have a free outlet through the openings 74. In lieu of the described endless apron I may, as shown in Fig. 5, employ the fixed table 75, which extends from the stripping-bar over the receiving end of the separator. When the table is used, the separator will be positioned to bring its receiving end 76 relatively near the stripping-cylinder, as shown.

The seeds fall from the separator onto an inclined and shouldered plate 77, carried by, and therefore vibrated with, the separator. This plate, with a fixed inclined plate 78, serves to direct the seed onto an endless apron 79, traveling transversely at the rear end of the machine, said apron operating to convey the contents to an elevator supported on the frame extension.

80 is the elevator-casing, which has the inclination shown and is provided with a discharge-spout 81, at which is suspended a seed-sack or other receptacle. Journaled in bearings in the casing is a roller 82, on the shaft of which is fixed a sprocket-wheel 83, connected by a chain 84 with a sprocket-wheel 85, which receives motion from the shaft 8 by beveled gearing 86. The apron 79 travels around said roller 82 and a roller 87 at the left-hand side of the main frame and intermediately under two rollers 88 and 89 at the bottom of the elevator-casing. A second inclined apron 90 travels around the roller 89 and around a roller 91 at the upper end of the casing, which last-named roller is driven from the roller 82 by interposed spur-gearing 92. By the described arrangement the aprons 79 and 90 are between the rollers 89 and 91 in contact and travel at the same rate of speed, the members of the gearing 92 being of the same diameter. The seeds falling on the apron 79 at its horizontal traverse are carried laterally to and between the inclined traverse of said apron and the apron 90 and are then positively elevated to the upper end of the casing and then fall through the spout 81 into the receptacle.

The separator is provided at its under side and at each opening with an inclined shoulder 93, the purpose of which is to prevent the passage through the opening of any fibers or other material which may enter the opening lengthwise. By the provision of the upper and lower shoulder the seeds alone find their way through the openings, the fibers and rubbish freed from the seed being propelled over the plate and discharging outside of the machine, as above stated.

My preferred construction of stripping-cylinder is shown in Figs. 6, 7, and 8. It consists, as above stated, of wheels or cylinders 53, a shell or series of bands 54, fixed to the wheels or spiders, segments 55, which are removably fastened on the wheel or bands, and stripping-fingers 56, which are headed at their inner ends and are passed through and beyond the segments, as shown more clearly in Fig. 7. The segments are fastened in place by bolts 94 94, passed through the shell or bands and through and beyond the segments and provided with nuts 94'. 95 is a metal strip extending longitudinally along each segment and is provided with holes, through which the fingers extend. The strip, which serves to firmly support the fingers beyond the segments, is confined by cross-plates 96, extending thereover and having holes to receive the bolts 94. This structure affords the desired strength and yet permits the removal of any one or a number of the finger-carrying segments without disturbing the others. The segments are bound centrally by a two-part ring 97, placed edgewise to avoid interference with the fingers. The parts or members of the ring are secured together by a pivot-bolt 98 and a securing-bolt 99.

I claim as my invention—

1. In a machine of the class described, the combination of a frame, a stripping-bar at the front of the frame, said bar being angular in cross-section, an upwardly and rearwardly inclined support for the material, the forward end of the support being contiguous to said bar, a stripping-cylinder carrying fingers and arranged in operative relation to said bar and the forward end of said support, and a vibratory shouldered and apertured seed-separator in lapped relation to said support.

2. In a machine of the class described, the combination of a frame, a stripping-bar at the front of the frame, said bar being angular in cross-section, an upwardly and rearwardly inclined support for the material, the forward end of the support being contiguous to said bar, a stripping-cylinder carrying fingers and arranged in operative relation to said bar and the forward end of said support, a vibratory shouldered and apertured seed-separator in lapped relation to said support, and an elevator for the separated seed, consisting of an endless apron having a horizontal traverse and an upwardly-inclined traverse, and a second inclined apron contacting during a portion of its traverse with the first-named apron.

3. In a machine of the class described, a stripping-cylinder having a series of segments removably secured in place, stripping-fingers extending from said segments, a metal strip having holes for the fingers, and removably-secured cross-plates for securing the strip.

In testimony whereof I affix my signature in presence of two witnesses.

THOMAS J. CAMPBELL.

Witnesses:
 ISAAC J. MEAD,
 ABRAHAM L. KEHARD.